INVENTOR.
MELVIN J. COTTERILL
BY Alfred C. Hill
AGENT

INVENTOR.
MELVIN J. COTTERILL
BY Alfred C. Hill
AGENT

United States Patent Office 3,181,074
Patented Apr. 27, 1965

3,181,074
COMPANDOR

Melvin J. Cotterill, Mountain View, Calif., assignor to International Telephone and Telegraph Corporation, Nutley, N.J., a corporation of Maryland Filed Aug. 24, 1962, Ser. No. 219,247
7 Claims. (Cl. 328—142)

This invention relates to compandors and more particularly to a novel compandor of the syllabic type.

When communication systems transmit voice channels, the effective signal-to-noise ratio is affected by the various talking levels encountered. The importance of this factor can be appreciated when it is noted that the dynamic range of an individual's voice is about 40 db (decibel) and the range between the loudest and softest voice is about 30 db. Considered together, the difference in level between the loudest syllable of the loudest voice and the softest syllable of the softest voice is approximately 70 db.

This variation in signal strength means that a louder voice would have a better signal-to-noise ratio than a soft voice. Thus, communication systems must be designed to provide the minimum acceptable signal-to-noise ratio, not only for full modulation, but also for the lower modulation provided by the soft-speaking individuals. If it were possible to reduce the wide deviation of signals, or in other words, to compress this range of speech power, then the requirements for the communication system could be correspondingly reduced. This compression of speech signals before exposure to the system noise is the basic idea of a compandor. Having compressed the speech or audio signal before transmission, it is then necessary to restore it after transmission to its original form, or, in other words, to expand it. The two operations then consist of a compressor and an expander and from these two words is derived the word "compandor" to designate the complete operation.

Compandors, operating on the original audio modulation signal, or resultant pulse amplitude modulated signals, have provided a signal-to-noise improvement of approximately 20 db. The importance of this improvement in signal-to-noise ratio may be appreciated by noting that in a radio relay system a greater distance between repeaters would be permitted, and hence, the elimination of one or more repeater stations in long systems with a resultant saving of many thousands of dollars. In a wire communication system, it would be permitted greater spacing of repeater amplifiers with the corresponding monetary saving.

Syllabic type compandors in the past have taken several forms. One form employs a non-linear circuit at the transmitting end of the system to bring about the desired compression and a complementary non-linear network at the receiving end of the system to return the compressed signal to its original form. A second type of syllabic compandor employs an arrangement to compress the audio signal under the control of a control signal with this control signal, or a signal proportional thereto, being transmitted along with the compressed audio signal. The receiver detects the transmitted control signal and employs this control signal along with an arrangement to expand the audio signal in a complementary manner to recover the original audio signal.

These prior art types of compandors have certain disadvantages, namely, the matching of circuit components at both the transmitter and receiver end of the system to provide an overall linear system from original signal input to the reproduction of this signal. This matching of circuit components and complexity of certain types of control circuits render this type of syllabic compandor relatively expensive. Likewise the incorporation of a separate channel in the transmission media for the transmission of a control signal from the transmitter to the receiver increases the complexity as well as the cost of the communication system.

An object of the present invention is to provide a novel compandor which overcomes the disadvantages of the prior art arrangements mentioned hereinabove.

Another object of the present invention is to provide audio signal (speech) compression and expansion employing a pulse conversion technique.

A feature of this invention is the provision of an arrangement to modify the amplitude of an audio signal comprising a means to produce pulses having a predetermined repetition frequency and a width varying in accordance with the amplitude of the injected audio signal, a means to amplitude modulate the resultant pulse in accordance with the injected audio signal, and a means to extract from the resultant amplitude modulated pulses the injected audio signal whose amplitude is modified in accordance with the width of the generated pulses.

Another feature of this invention is the provision of an amplitude compressor wherein the width of the generated pulses is decreased proportionally to the increasing amplitude of the injected audio signal.

Still another feature of this invention is the provision of an amplitude expander wherein the width of the generated pulse is increased proportionally to increasing amplitudes of the injected audio signal.

A further feature of this invention is the provision of a variable delay multivibrator synchronized with trigger pulses having a repetition rate equal to the predetermined repetition rate and a rectifier circuit to produce a control signal proportional to the amplitude of the injected audio signal to control the width of the pulse output of the delay multivibrator to provide either compression or expansion action.

Still a further feature of this invention is the provision of an inductor, a clipping circuit to generate a control signal in accordance with the amplitude of the injected audio signal, a sampling pulse generator having a waveform of given configuration depending upon whether the circuit is to be employed for amplitude compression or expansion and a switching device interconnecting the clipping circuit, the inductor, and the sampling pulse generator to provide pulses varying in width in accordance with the characteristic of the sampling pulses and the control signal to provide either amplitude compression or expansion of the injected audio signal.

Another feature of this invention is the provision of a diode modulator operating with either of the variable width pulse sources above described to amplitude modulate the resultant variable width pulses in accordance with the amplitude of the injected audio signal and a lowpass filter to extract from the resultant amplitude modulated pulses the injected audio signal whose amplitude is modified in accordance with the width of the generated pulses.

The above-mentioned and other features and objects of this invention will become more apparent by reference to the following description taken in conjunction with the accompanying drawings, in which.

Figure 1:
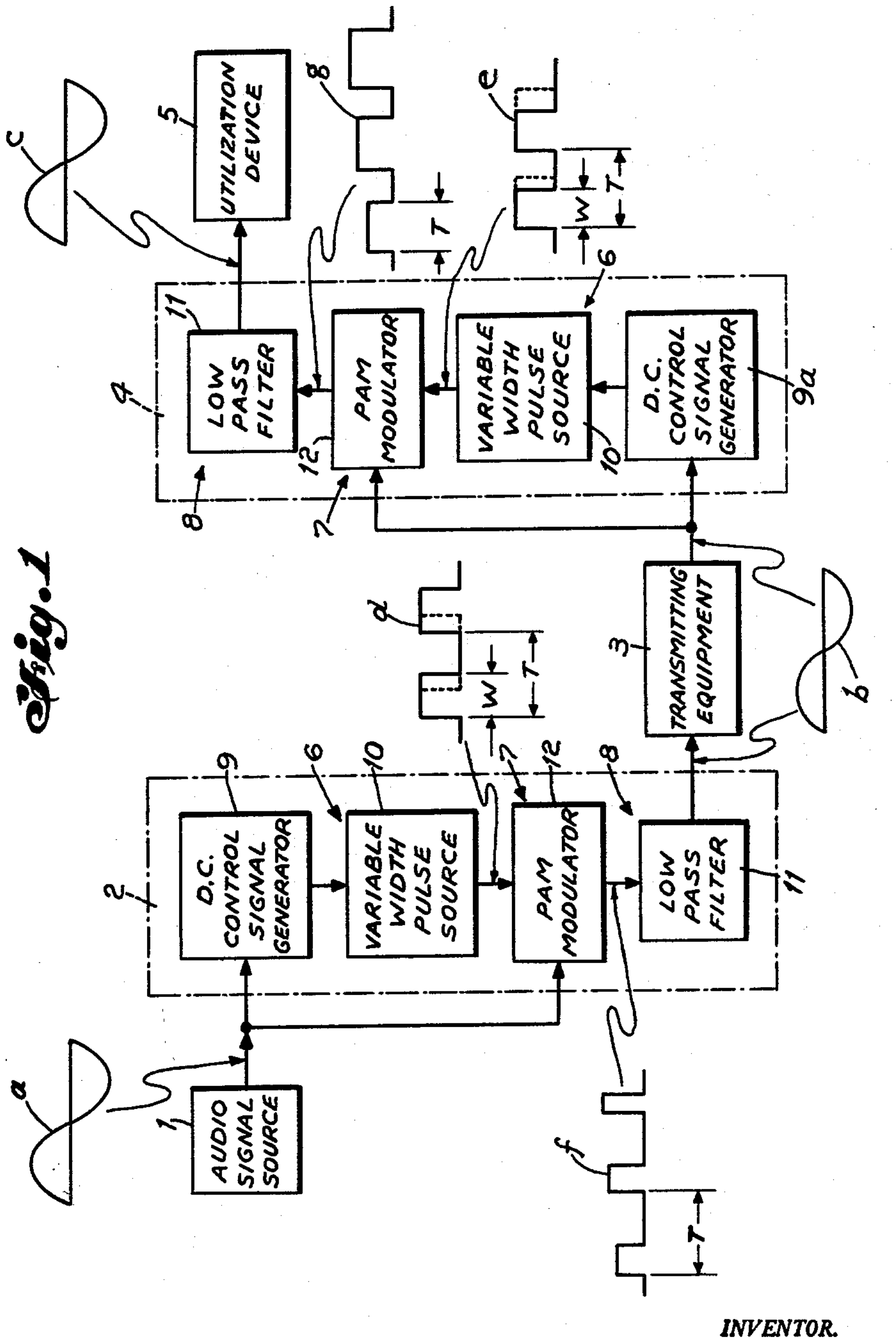
FIG. 1 is a schematic diagram in block form of a communication system employing the amplitude modifying arrangement of this invention as a compressor at the transmission end of the system and an expander at the receiving end of the system.

Referring to FIG. 1, a communication system is diagrammatically illustrated including two amplitude modifying arrangements in accordance with the principles of this invention. As illustrated, an audio signal (curve *a*) from source 1 is injected into amplitude modifying arrangement 2 for the purpose of compressing the amplitude of the injected audio signal. The compressed audio signal (curve *b*) of arrangement 2 is coupled to transmission equipment 3 which may include known equipment for radio communication or wire communication at both the transmitting and receiving ends of the system and the transmission medium itself. The compressed audio signal present at the output of equipment 3 is coupled to amplitude modifying arrangement 4 for the purpose of expanding the compressed audio signal to recover the original audio signal injected from source 1. The resultant output (curve *c*) of arrangement 4 is coupled to utilization device 5 which may take the form of any signal reproducing device, such as a loudspeaker recorder or the like.

Each of arrangements 2 and 4 include the same components. The difference between the two arrangements is in the operation thereof to bring about their desired action, that is, either compression or expansion of the signal amplitude. Broadly, both arrangements 2 and 4 include a means 6 to produce pulses (curves *d* and *e*, respectively) having a predetermined repetition frequency and a width varying in accordance with the amplitude of the injected audio signal, that is the audio signal from source 1 or the compressed audio signal from equipment 3. A means 7 is coupled to the source of the injected audio signal (source 1 or equipment 3) and to means 6 to amplitude modulate the pulse output of means 6 in accordance with the amplitude of the injected audio signal. The output (curves *f* and *g*, respectively) of means 7 is coupled to a means 8 to extract from the amplitude modulated pulses at the output of means 7 the audio signal present thereon but with an amplitude modified in accordance with the width of the pulses.

More specifically, means 6 includes a control signal generator 9 in arrangement 2 coupled directly to source 1 to produce a positive D.C. (direct current) control signal proportional to the amplitude of the injected audio signal (curve *a*) of source 1 and a variable width pulse source 10 operating to produce pulses (curve *d*) having a predetermined repetition frequency and whose pulse width is decreased in proportion to increasing amplitude of the control signal of generator 9 and, hence increasing amplitude of the audio signal of source 1. In the arrangement 4, generator 9*a* is included as a portion of means 6 and is coupled directly to equipment 3 to produce a negative D.C. control signal proportional to the amplitude of the audio signal (curve *b*) injected into arrangement 4 from equipment 3. The resultant control signal of generator 9*a* operates upon the width of the pulses (curve *e*) of source 10 to increase the width of these pulses in accordance with increasing amplitude of the control signal and, hence, the injected audio signal. Employing the proper components in the arrangements of 2 and 4, it is possible to provide at utilization device 5 the original signal as injected from source 1 since the tandem operation of arrangements 2 and 4 will provide an overall linear system of compression and expansion.

Means 8 in both arrangements 2 and 4 is a lowpass filter 11 operating on the output of means 7, a PAM (pulse amplitude modulation) modulator 12, to remove the audio signal content of the resultant PAM pulses. It can be shown mathematically, and it will also be recognized by inspection, that the output of filter 11 is related to the original modulation, that is, the injected audio signal, as a linear function of the width W of the pulse width output of source 10. Thus, if the width W is made a suitable function of syllabic power of the modulating audio signal, compression will result in arrangement 2 and expansion will result in arrangement 4.

In practicing this invention it will be necessary that the repetition rate T of the pulses of source 10, the sampling pulses, be equal to or greater than $1/T$.

With regard to the output of modulator 12, it will be observed that actually there is a combination of width modulation and amplitude modulation of the width modulated pulses with a common signal source as the modulating signal. Thus, the width modulation of the pulses modulated on an amplitude basis will modify the amplitude of the audio signal extracted by filter 11 from the output of modulator 12 directly proportional to or as a predetermined function of the modulated width of these pulses.

Figure 2:
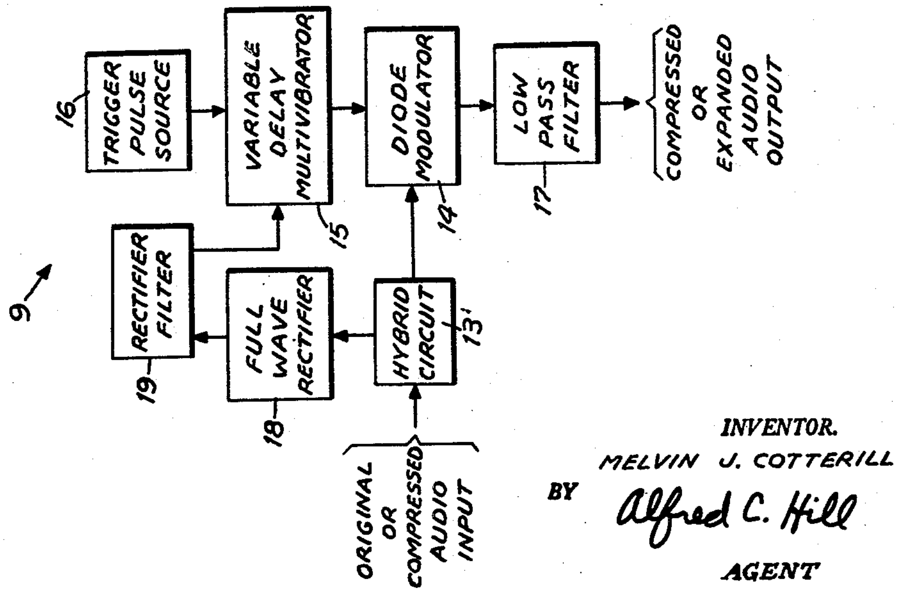
FIG. 2 is a schematic diagram in block form of one embodiment of the amplitude modifying arrangement of this invention.

Referring to FIG. 2, an embodiment of an amplitude modifying arrangement is illustrated capable of being employed in either arrangement 2 or arrangement 4 to bring about the desired compression and expansion. The original audio signal, such as from source 1 or the compressed audio signal from equipment 3, is coupled to a hybrid circuit 13 with one output therefrom being coupled to a diode modulator 14 and the other output therefrom being coupled to the D.C. control signal path. A delay multivibrator 15 is coupled to modulator 14 and produces pulse outputs having a predetermined repetition frequency in accordance with the repetition frequency of trigger pulses from source 16. Multivibrator 15 is the usual delay type multivibrator which as is known is a monostable multivibrator which is triggered by a trigger pulse, such as the pulses of source 16, to flip to its unstable condition which, due to the components of the monostable multivibrator will return to its stable state after a predetermined time interval. The circuit of the monostable multivibrator is arranged to permit the control of the duration of the pulse generated after being triggered to its unstable state to vary the delay provided by the multivibrator and, hence, the width of the generated pulse. With the amplitude of the pulse output of multivibrator 15 being sufficient to switch modulator 14, there will result an amplitude modulated pulse output which if applied through a lowpass filter, such as filter 17, would recover the original modulating signal. It is, of course, recognized that the amplitude of the recovered modulation signal at the output of filter 17 is proportional to the width W of the generated pulse output of multivibrator 15. By controlling the width of the pulse generated by multivibrator 15 a compression or expansion of the modulating signal coupled to modulator 14 will result. To carry out this operation, generator 9 of embodiment of FIG. 2 includes a full-wave rectifier 18 coupled to hybrid circuit 13 to produce a rectified signal proportional to the amplitude of the signal injected into hybrid 13. The output of rectifier 18 is coupled to a rectifier filter 19 to provide a D.C. control signal proportional to the amplitude of the injected audio signal. For compression operation the rectifier 18 is arranged to provide positive rectification of the audio signal and, hence, a positive control signal which when applied to multivibrator 15 will act to narrow the generated pulses with this narrowing of the pulse being proportional to the amplitude of the injected audio signal. Under these conditions the output of filter 17 will be an audio signal having an amplitude level less than the amplitude of the original audio signal due to the narrowing of the pulse output of multivibrator 15. Thus, if the pulse width of the output of multivibrator 15 follows approximately the syllabic level of audio signal energy, the action achieved will be identical to a conventional compressor. The time constant present in filter 19 may be adjusted to provide the pulse width of the output of multivibrator 15 with the proper characteristic to provide the desired compression characteristic.

When the arrangement of FIG. 2 is employed in the expander, arrangement 4, rectifier 18 is arranged for negative rectification of the compressed audio signal input so that at the output of filter 19 a negative control signal is provided having an amplitude proportional to the amplitude of the compressed audio signal. This negative control signal will operate to widen the pulses generated in multivibrator 15 by maintaining the multivibrator in its unstable condition for a longer period of time than normal. By proper adjustment of the time constant of filter 19 the resultant variable pulses at the output of multivibrator 15 can be caused to follow the syllabic level of the compressed audio input and, hence, the resultant output of filter 17 will be an expanded audio signal which is identical with the original audio signal injected into the transmission end of the system.

Figure 3:
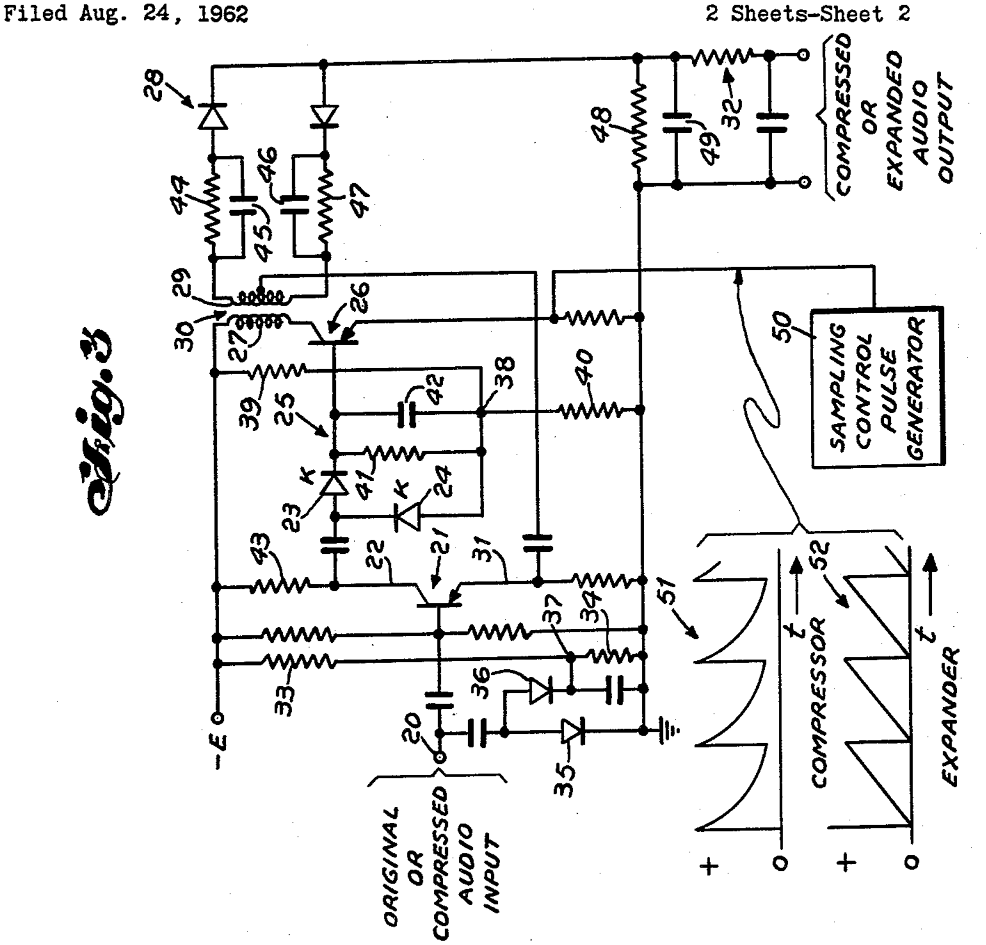
FIG. 3 is a schematic diagram of another embodiment of the amplitude modifying arrangement of this invention.

Referring to FIG. 3, there is illustrated therein another arrangement to provide compandor action in accordance with the principles of this invention. As illustrated in FIG. 3, the circuit is arranged to provide compression action and with the reversal of two components in this schematic diagram it will be possible to provide expander action which variation will be described hereinbelow.

The audio signal is injected into the circuit on terminal 20 and coupled to transistor 21, biased to provide conduction of the audio signal therethrough without distortion of the audio signal. The audio signal appearing on the collector electrode 22 of transistor 21 is coupled to a clipping circuit including diode 23 and diode 24. Diodes 23 and 24 are poled to pass the positive portion of the injected audio signal. The portion passed by this clipping circuit is operated upon by filter 25 to provide the positive control signal for compressor operation. The control signal output of filter 25 is coupled to the base of transistor 26 operating as a switch to produce in inductance 27 a pulse which may be varied in duration by controlling the operation of transistor 26 as will be described hereinbelow. The pulse produced in inductance 27 is coupled to diode modulator 28 through means of the secondary 29 of the transformer 30. The injected audio signal appearing on emitter 31 of transistor 21 is coupled to the center tap of secondary winding 29 to bring about the PAM modulation as described hereinabove with reference to FIGS. 1 and 2. The PAM output of modulator 28 is then coupled to a lowpass filter 32 to extract, as before, the audio signal present on the PAM pulses with the amplitude of this extracted audio signal being modified in accordance with the width of the pulses generated in inductance 27.

By properly selecting the value of resistors 33 and 34, a limiting potential is provided to avoid under modulation when the circuit is employed for compression operation and over modulation when the circuit is employed for expander operation. This limiting potential is established at point 37. A second limiting potential is provided at point 38 by the selection of the value of resistors 39 and 40 to avoid reducing the generated pulse to zero. The time constant provided by resistor 41 and capacitor 42 of filter 25 is the decay time constant and the time constant provided by resistor 43 and capacitor 42 is the attack time constant. The time constant provided by resistor 44 and capacitor 45 is equal to the time constant provided by capacitor 46 and resistor 47 which time constant should be equal to approximately ten times the sampling period to thereby provide in conjunction with the time constant of resistor 48 and capacitor 49 a reasonable zero order data hold and partial filtering without loss of amplitude.

Let us now consider the operation of the circuit of FIG. 3 for compression of an injected audio signal. With no D.C. control input and no input from generator 50, transistor 26 will be conducting since the voltage at the collector is more positive than the operating potential —E and also positive with respect to the emitter of transistor 26. Also the base of transistor 26 will be more positive with respect to the potential of the emitter of transistor 26. With a sampling pulse output of generator 50 having the wave shape illustrated in curve 51, the transistor 26 will be rendered non-conductive since the waveform 51 at its initial instant will render the emitter positive with respect to the base. Transistor 26 will remain cut-off until the level of waveform 51 reaches a point that will make the emitter of transistor 26 negative with respect to the base to restore conduction. The pulse width thus generated is the length of time from the start of the sampling cycle to a point on the waveform where conduction starts. For compression action the output of filter 25, as explained hereinabove, is a positive D.C. control potential varying in accordance with the amplitude of the audio signal. This positive potential applied to the base of transistor 26 will render the base thereof more positive with respect to the emitter. Thus, the effect of this positive potential on the base of transistor 26 will cause transistor 26 to become conductive closer to the start of the cycle of the sampling signal 51 resulting in a narrower pulse than would be obtained if the sampling signal was present on the emitter of transistor 26 and no control potential was applied to the base of transistor 26.

Considering now the case where the circuit of FIG. 3 is employed for expansion operation. For an expansion operation diodes 23 and 24 must be poled opposite to that illustrated in FIG. 3 to pass the negative portion of the sine wave and, hence, provide at the output of filter 25 a negative control signal. Transistor 26 is conducting for the reasons mentioned hereinabove with respect to the compression operation. The sampling control pulse output of generator 50, having the waveform illustrated in curve 52, is applied to the emitter of transistor 26 and the emitter will become increasingly positive with respect to ground and will reach a point along this wave where the transistor 26 will become nonconductive due to the voltage relationship between the emitter and collector. The pulse width is determined by the distance in time between the point of cut-off of transistor 26 and the end of a single cycle of waveform 52. The negative control potential at the output of filter 25 is applied to the base of transistor 26 which will cause the base to go more negative and approach the cut-off condition of transistor 26. Thus, with both the sampling waveform 52 and the negative control signal, transistor 26 will cut-off sooner in time than when waveform 52 is present by itself on the emitter of transistor 26, thereby widening the pulse generated in inductor 27.

While I have described above the principles of my invention in connection with specific apparatus, it is to be clearly understood that this description is made only by way of example and not as a limitation to the scope of my invention as set forth in the objects thereof and in the accompanying claims.

I claim:

1. An arrangement to modify the amplitude of an audio signal comprising:
 a source of audio signal;
 means coupled to said source to produce pulses having a predetermined repetition frequency and a width varying in accordance with the amplitude of said audio signal;
 means coupled to said source and said pulse producing means to amplitude modulate said pulses in accordance with said audio signal; and
 means coupled to said modulation means to extract from said amplitude modulated pulses said audio signal having its amplitude modified in accordance with the width of said pulses.

2. An arrangement to modify the amplitude of an audio signal comprising:
 a source of audio signal;
 a source of variable width pulses having a predetermined repetition frequency;
 means coupled to said source of audio signal to produce a control signal proportional to the amplitude of said audio signal;
 means to couple said control signal to said source of pulses to control the width of said pulses;

means coupled to said source of pulses and said source of audio signal to amplitude modulate said width controlled pulses in accordance with said audio signal; and means coupled to said modulation means to extract from said amplitude modulated pulses said audio signal having its amplitude modified in accordance with the width of said pulses.

3. An arrangement according to claim 2, wherein said source of pulses includes:

a source of trigger pulses having a repetition frequency equal to said predetermined frequency; and a delay multivibrator coupled to said source of trigger pulses having the delay thereof controlled by said control signal.

4. An amplitude compressor for an audio signal comprising:

a source of audio signal;

means coupled to said source to produce pulses having a predetermined repetition frequency and a width decreasing in accordance with an increasing amplitude of said audio signal;

means coupled to said source and said pulse producing means to amplitude modulate said pulses in accordance with said audio signal; and means coupled to said modulation means to extract from said amplitude modulated pulses said audio signal having a compressed amplitude proportional to the width of said pulses.

5. An amplitude compressor for an audio signal comprising:

a source of audio signal;

a delay multivibrator;

a source of trigger pulses having a predetermined repetition frequency coupled to said multivibrator to control said multivibrator for production of pulses having said predetermined repetition frequency;

a rectifier circuit coupled to said source of audio signal to produce a positive direct current control signal proportional to the amplitude of said audio signal;

means to couple said control signal to said multivibrator to decrease the width of said pulses in accordance with the magnitude of said control signal;

a diode modulator circuit coupled to said multivibrator and said source of audio signal to amplitude modulate said width controlled pulses in accordance with said audio signal; and a lowpass filter coupled to said modulator to extract from said amplitude modulated pulses said audio signal having a compressed amplitude proportional to the width of said pulses.

6. An amplitude expander for an audio signal comprising:

a source of audio signal;

means coupled to said source to produce pulses having a predetermined repetition frequency and a width increasing in accordance with increasing amplitudes of said audio signal;

means coupled to said source and said pulse producing means to amplitude modulate said pulses in accordance with said audio signal; and means coupled to said modulation means to extract from said amplitude modulated pulses said audio signal having an expanded amplitude proportional to the width of said pulses.

7. An amplitude compandor for an audio signal comprising:

a source of audio signal;

first means coupled to said source to produce pulses having a first predetermined repetition frequency and a width decreasing in accordance with an increasing amplitude of said audio signal;

first modulator means coupled to said source and said first pulse producing means to amplitude modulate said pulses in accordance with said audio signal;

means coupled to said first modulator means to extract from said amplitude modulated pulses said audio signal having a compressed amplitude proportional to the width of said pulses;

means coupled to said means to extract to transmit said compressed audio signal to a distant location;

means disposed at said distant location to receive said transmitted compressed audio signal;

second means coupled to said means to receive to produce pulses having a second predetermined repetition frequency and a width increasing in accordance with increasing amplitudes of said compressed audio signal;

second modulator means coupled to said means to receive and said second pulse producing means to amplitude modulate said pulses in accordance with said compressed audio signal; and means coupled to said second modulator means to extract from said amplitude modulated pulses said compressed audio signal having an expanded amplitude proportional to the width of said pulses.

References Cited by the Examiner

UNITED STATES PATENTS

| | | | |
|---|---|---|---|
| 2,750,499 | 6/56 | Newman et al. | 328—121 X |
| 2,852,609 | 9/58 | Plouffe | 179—15 |
| 2,923,887 | 2/60 | Aiken | 333—13 X |
| 2,952,812 | 9/60 | Klein et al. | 332—17 X |
| 2,979,611 | 4/61 | Halina | 332—44 X |

FOREIGN PATENTS 1,238,890 7/60 France.

OTHER REFERENCES

Christiansen et al.: "Compandor System for . . . Telephony," Electrical Communication, No. 1, 1958, pages 28–45, Figure 2 relied on.

JOHN W. HUCKERT, *Primary Examiner.*

ARTHUR GAUSS, *Examiner.*